No. 804,172. PATENTED NOV. 7, 1905.
A. PRUVOT.
MACHINE FOR TOPPING BEET ROOTS.
APPLICATION FILED FEB. 11, 1903.
3 SHEETS—SHEET 3.
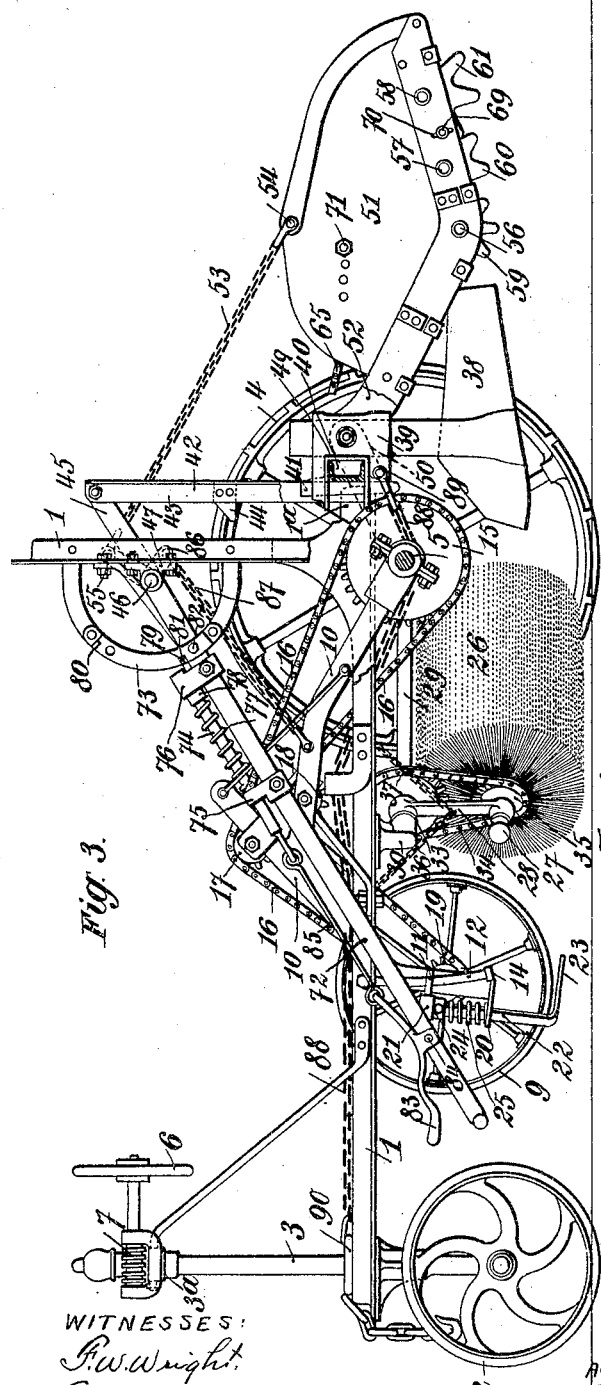
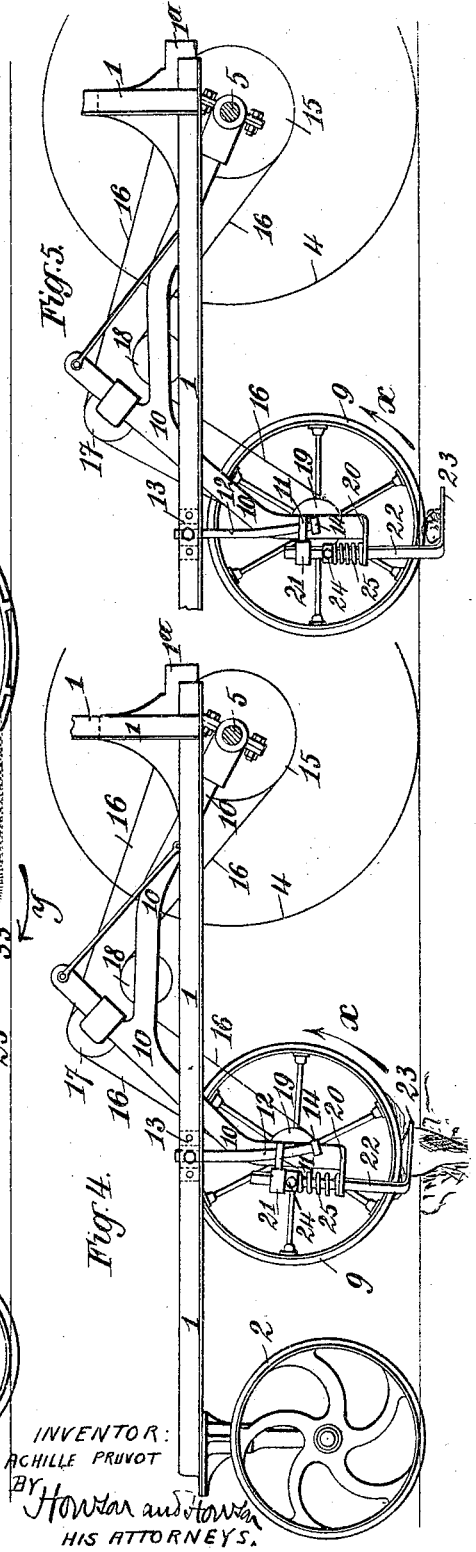
WITNESSES:
F. W. Wright
E. W. Collins
INVENTOR:
ACHILLE PRUVOT
BY Howson and Howson
HIS ATTORNEYS.

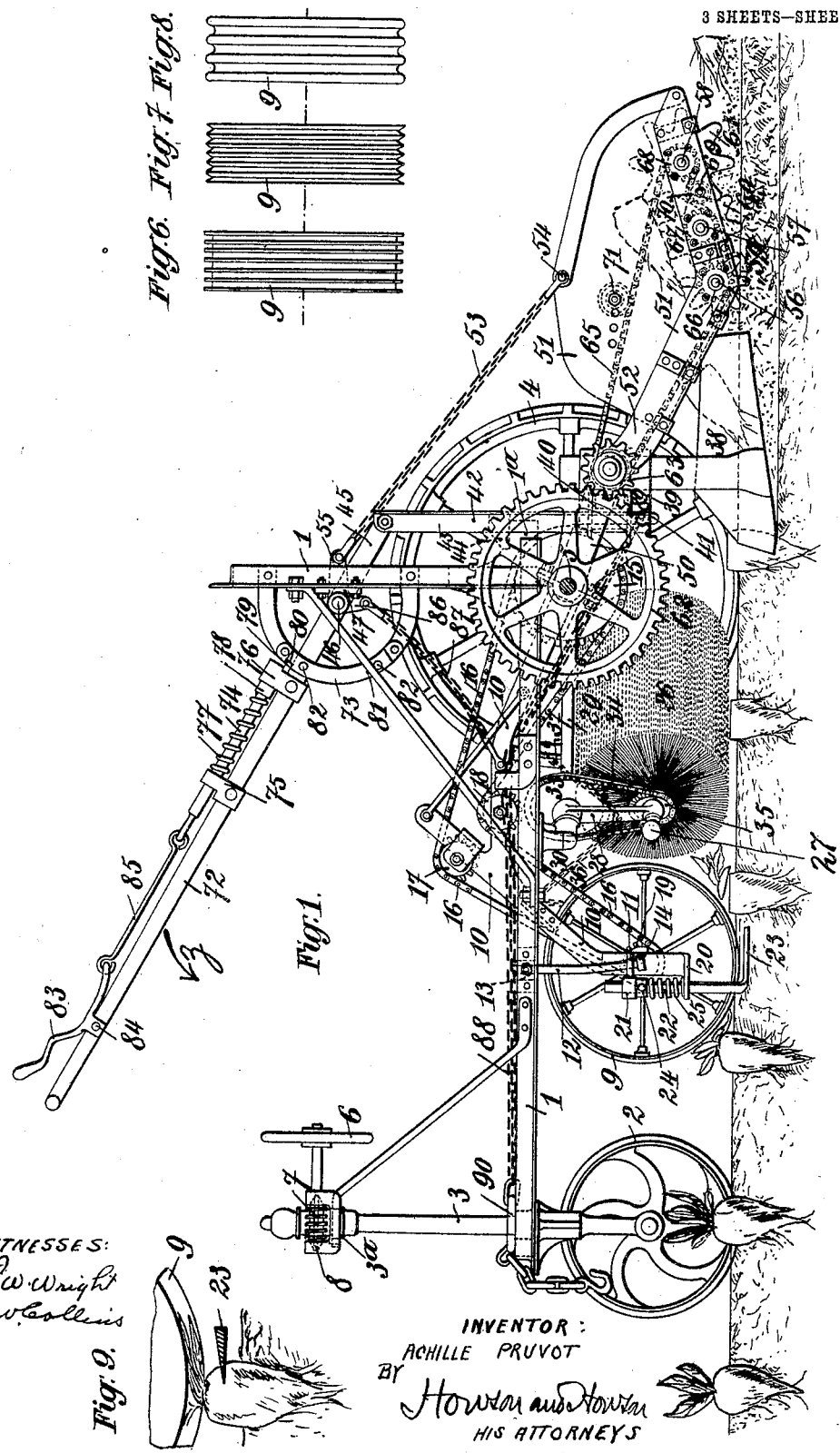

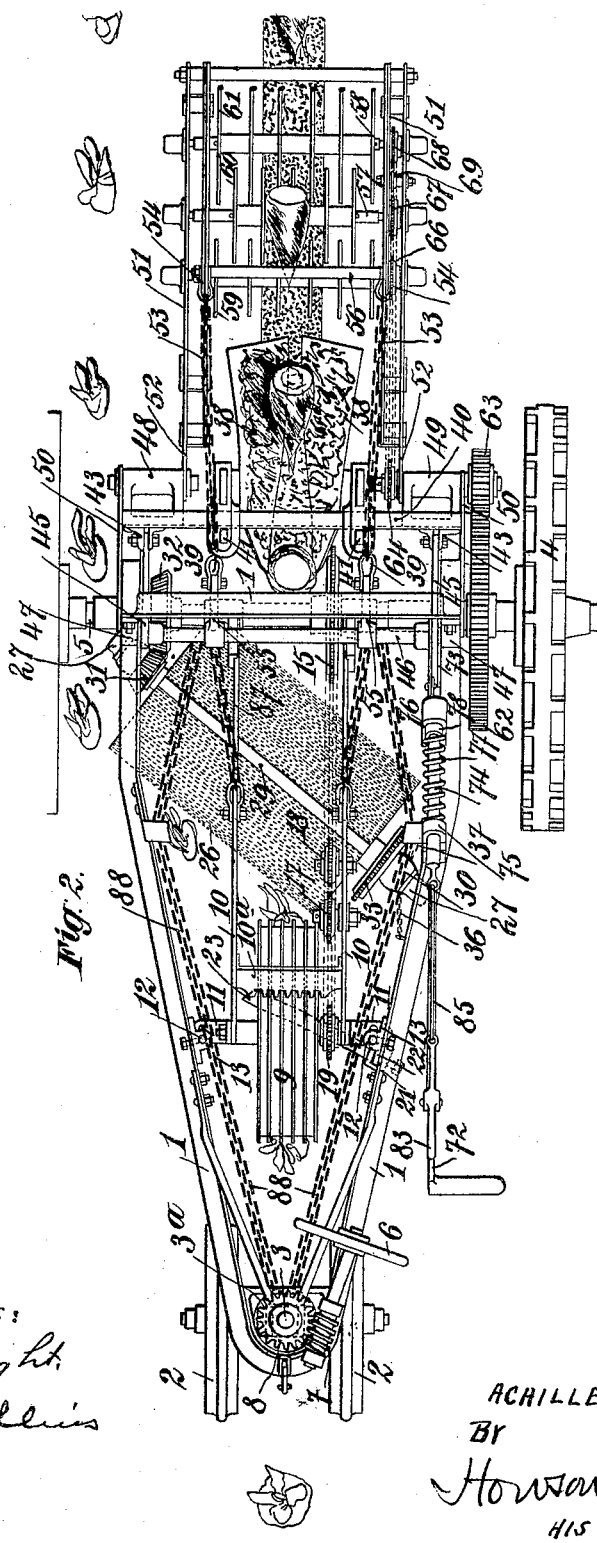

UNITED STATES PATENT OFFICE.

ACHILLE PRUVOT, OF VALENCIENNES, FRANCE.

MACHINE FOR TOPPING BEET-ROOTS.

No. 804,172. Specification of Letters Patent. Patented Nov. 7, 1905.

Application filed February 11, 1903. Serial No. 142,948.

*To all whom it may concern:*

Be it known that I, ACHILLE PRUVOT, manufacturer, a citizen of the French Republic, residing at Valenciennes, in the Department of Nord, France, have invented a certain new and useful Machine for Topping Beet-Roots, (for which I have applied for Letters Patent in France, dated December 12, 1902,) of which the following is a full, clear, and exact description.

This invention relates to machinery for harvesting beets or the like, and has for its object to provide means for topping the beets while in the ground.

The machine is described with reference to the accompanying drawings, in which—

Figure 1 is an elevation, one of the wheels being removed to show the parts behind the same; otherwise this figure shows the machine ready for working. Fig. 2 is a plan view of Fig. 1. Fig. 3 is an elevation, part section, the working parts being closed up for transport. Figs. 4 and 5 are detail views showing various operations. Figs. 6, 7, and 8 relate to modified forms of the top-removing wheel. Fig. 9 is a detail view of the knife of such wheel.

The machine consists of a carriage-frame mounted on four wheels, two of which, 2 2, form a fore-carriage secured to an upright shaft 3, which is maintained in a socket $3^a$. The other two wheels 4, located at the rear, are mounted on a shaft 5, supported and rotatable in the frame 1.

The fore-carriage, formed by the wheels 2, can be moved or steered by means of a handwheel 6, the shaft of which is provided with a worm 7, which engages a worm-wheel 8, secured on the shaft 3. This arrangement enables the fore-carriage to be turned in any direction without it being moved by the inequalities of the ground.

Rearward of the fore-carriage is the topping or top-removing device 9, consisting of a wheel having a broad rim on which are provided ribs forming a series of circular grooves. These may be of various shapes, as shown, for example, in Figs. 6, 7, and 8. The wheel 9 (shown on the machine) illustrated is of the type represented in Fig. 6. The top-removing wheel 9 is journaled in a framework 10, supported by the axle 5, upon which it can pivot. To avoid lateral deviations of the frame 10 with its wheel 9, this frame is fitted with two lugs 11, with which engage two rods 12, fixed to straps 13 on the frame and ended by heads 14 beneath the lugs 11. This arrangement prevents the frame 10 and wheel 9 from deviating laterally and permits the sinking of the topping-knife in the ground to be regulated by means of the height at which the rods 12 are fixed to the carriage 1.

The wheel 9 is rotated from the axle 5 by means of a sprocket-wheel 15 and chain 16, passing over intermediate sprocket-wheels 17 and 18 and engaging a wheel 19, keyed on the shaft of the topping-wheel 9. In the machine illustrated the speed of rotation of this wheel is about twice the speed of the axle 5 and takes place in the direction of the arrow $x$. A serrated plate $10^a$ forms a kind of comb, Fig. 2, which frees the grooves in the wheel 9 from earth or leaves which remain adhering thereto. The intermediate chain-wheels 17 and 18 are mounted on the frame 10, the position of the wheel 17 being variable, so that the tension of the chain 16 can be adjusted.

One of the sides of the frame 10 is prolonged beneath the axis of the topping-wheel 9 by an L-shaped arm 20, and the lug 11 is similarly extended by a socket 21. The rod 22 of the knife 23 is guided vertically in the socket 21 and in the arm 20 of the frame. A ring 24 is fixed to the rod 22 of the knife, (see Figs. 4 and 5,) which is held up by a strong spring 25, interposed between the guide-arm 20 and the ring 24, fixed on the knife, the blade 23 of the knife passing as a guillotine under the topping-wheel 9—that is, in a direction oblique to the axis of this wheel. The rod 22 of the blade 23 has imparted to it by the guides 20 and 21 an oblique direction relatively to the axis of the wheel 9. This construction gives to the knife-blade a great resistant strength. The distance between the blade 23 and the lower part of the ribs in the wheel 9 can be varied by moving the ring 24 upon the rod 22 of the knife, this ring bearing upon the strong spring 25.

The wheel 9 guides the knife 23 upon the top or neck of the beet. When this wheel comes into contact with a beet, the leaves of the latter lodge in the grooves between the ribs, which action is facilitated by the relatively great speed at which this wheel rotates, and the ribs of the wheel rest upon the top or neck itself of the beet. In this movement the knife 23, which is fast to the wheel 9 as regards its rise and fall, cuts or shears the part of the neck of the beet included between the lower part of the ribs of the wheel 9 and the blade 23 of the knife. It follows that whatever be the height of the neck of the beet-root above the ground the knife always cuts off this neck a thickness corresponding to the space determined by the distance left between its blade and the lower part of the ribs of the wheel 9. (See Fig. 4.) The section of the blade 23 is triangular, and this section is arranged so that the lower side is horizontal, as shown in Fig. 9, the inclined portion being directed upward. By this means the knife has no tendency to rise and to cut the neck obliquely. When a stone or other hard substance becomes located between the knife 23 and the ribs of the wheel 9, the spring 25 yields and allows the blade to drop down, Fig. 5, so that the stone is expelled by contact with the rapidly-revolving wheel 9. This spring 25 is formed very strong, so as to yield only under the great pressure which results from the introduction of a resisting body and not to yield during the ordinary work of shearing off the top of the beet.

Behind the wheel 9 is located obliquely to the direction of travel of the machine a brush 26 of cylindrical shape, the axle 27 of which is suspended by arms 28, jointed to shaft 29, which is itself supported by trunnions 30, fixed to the carriage-frame 1 of the machine. At one of its extremities the shaft 29 is provided with a bevel-wheel 31, engaging a second bevel-wheel 32, keyed on the axle 5. On the other end of the shaft 29 is keyed a wheel 33, which by means of a chain 34 and a wheel 35 transmits the movement of the axle 5 to the brush 26, which revolves in the direction of the arrow $y$. This brush 26 is intended to remove to the side of the machine the tops or necks with the leaves thereon. (See Fig. 2.) Chains 36 37 are fixed to one of the arms 28 and to the frame 1 of the machine. By shortening or lengthening these two chains the aforesaid brush may be respectively raised or lowered. At the rear of the brush 26 are located plowshares 38 38. The blades of the shares are formed with a wedge-shaped opening between them and are inclined downwardly, so that as the beet passes from the point of the share to the rear of the blade it is raised, as will be understood from Fig. 1. The shares are fixed in straps 39 39, which are secured to a U-shaped clamp 40 by means of suitable keys 41. This clamp 40 is fast to two uprights 42 42, each formed of two angle-irons 43 43, crosstied by a flat bar 44. The upper extremity of these two uprights is jointed to two levers 45 45, keyed on a shaft 46, journaled in supports 47 47, secured to the carriage-frame 1. To the extremities of the clamp 40 are fixed supports 48 49. The lower part of the frame, formed by the uprights 42 and the clamp 40, is hinged to the axle 5 by two cranks 50 50, jointed at their other ends to the supports 48 49 of the frame.

The parts 42 42 40 form a parallelogram having two fixed points of rotation 5 and 46 and two points hinged at the opposite extremity of the levers 45 and cranks 50. The uprights 42, which carry the shares, thus move always vertically, and the shares themselves remain always perpendicular to the ground.

Rearward of the shares is arranged a cleaning device which consists of a frame 51, having arms 52, jointed to the supports 48 and 49. This frame is also held by means of two chains 53 53, secured thereto at 54 54 and also connected to two lever-arms 55 55, keyed upon the shaft 46. In the frame 51 are trunnioned three shafts 56, 57, and 58, on which are threaded or slipped a number of toothel rowels, respectively, 59, 60, and 61. These rowels are fixed upon the shafts in such a manner that those of the shaft 57 correspond with the spaces existing between the rowels of shafts 56 and 58. These rowels are rotated from the axle 5 by means of a gear-wheel 62, keyed on said axle and engaging a pinion 63, fixed upon a shaft pivoted in the support 49. At the end of this shaft is keyed a sprocket-wheel 64, around which passes a chain 65, which also passes over sprocket-wheels 66 67 68, keyed, respectively, on the shafts 56 57 58. Between the shafts 57 and 58 the chain passes over a tension-roller 69, fixed in a slot 70 and capable of being moved vertically to tension the chain. Above the shaft 56 this chain also passes under another tensioning-roller 71, capable of lateral adjustment, likewise for tensioning the chain.

The beet-root when it rises between the shares 38 is delivered onto the rowels 59 60 61, which by means of their teeth shake the beet and free it from the greater portion of the earth adhering thereto while at the same time conveying it and depositing it rearward of the machine, where it may be picked up.

For the transport of the machine the working parts can be raised by a lever 72, fixed to the shaft 46. This lever moves in a sector 73 and is held in its two extreme positions by a spring-impelled locking-bolt consisting of a rod 74, guided in two supports 75 76, fixed to the lever, a spring 77 on said lever being compressible between support 75 and a shoulder 78 on the rod 71. One of the ends of the rod is fitted with a bolt 79, capable of engaging under pressure of the spring 77 in notches 80 81 in the sector 73. A pin or bolt 82 insures the position of the bolt in a still more certain manner, so that in the position shown in Fig. 1 the parallelogram supporting the shares and the cleaning apparatus is quite solid with the carriage-frame of the machine.

A small lever 83, fulcrumed at 84, enables the bolt 79 to be disengaged from the sector by means of the intermediate connecting-rod 85 and the lever 72 to be lowered in the direction $z$. In this movement the lever 72 draws with it the shaft 46, which raises the wheel 9 and knife 23 by means of two arms 86, fixed to the shaft 46 and to the extremities of which are attached two chains 87, the ends of which are fixed to the frame 10. It is to be noted that during the working of the wheel 9 these chains 87 are not tensioned and leave completely free the oscillation of the lower-frame 10. In this same movement of lowering the lever 72 the shaft 46 draws with it the levers 45 and 55. The levers 45 raise the shares, causing the frame 42 40 to pivot around the axle 5, and the levers 55 raise the rearmost cleaning device by means of the chains 53, and all the parts are then in the position shown in Fig. 3. During the rise and fall of the frame 42 40, carrying the shares 38, this frame is guided laterally by the end 1ᵃ of the frame engaged between the angle-pieces 43 of each of the uprights 42. The cross-tie 44 rests on this extremity 1ᵃ during the lowering of the shares for their work, as shown in Fig. 1.

It will be noted that the traction of the machine takes place directly upon the uprooting device, the draft-chains 88 88 being fixed at 89 89 to the lower part of the straps 39, to which the uprooting-shares are fixed. These chains are connected in the fore part of the machine to a ring or collar 90, embracing the steering-post 3 and leaving this post quite free.

The working of the machine is as follows: The machine, the parts of which are in the position of Fig. 3, is placed in line with a row of beet-roots, so that these latter pass between the steering-wheels 2, said wheels being steered by the hand-wheel 6. The lever 72 is raised and the parts assume the position shown in Figs. 1 and 2. In this state the machine is advanced, and when the wheel 9 meets a beet it rises on the neck of the latter, which it feels with its ribs, and, the wheel continuing to advance, the knife 23 shears off the neck. The brush 26 pushes the neck and its leaves to the side, and thus leaves a free passage for the uprooting-shares 38. These shares pull up the beet-root, which then reaches the cleaning apparatus. The rowels of the latter shake and convey the beet, which is thus deprived of most of the earth which may have adhered to it, and, finally, the beet falls out to the rear of the machine, where it is ready to be picked up.

I claim as my invention—

1. Beet-harvesting machinery, comprising a carriage-frame, a topping-wheel mounted thereon, means for rotating it, and a knife yieldingly mounted at a predetermined distance below the said wheel, substantially as described.

2. Beet-harvesting machinery, comprising a carriage, a topping-wheel, and a knife at a predetermined distance below it, and means for rotating the wheel at a speed greater than that of the travel of the carriage, in combination with a rotating brush in the rear of said wheel, substantially as described.

3. Beet-harvesting machinery, comprising a carriage, a topping-wheel, a framework therefor, a knife carried below the wheel, traction-wheels, an axle and sprocket therefor, said pivoted framework being pivoted centrally with said axle, a sprocket for the top-removing wheel, and a chain between the sprockets, substantially as described.

4. Beet-harvesting machinery, comprising a carriage, a framework, a topping-wheel carried thereby, lugs on the framework, a knife having its blade beneath the wheel, and its shank yieldingly held in said lugs, substantially as described.

5. Beet-harvesting machinery, comprising a carriage, a framework, a topping-wheel carried thereby, lugs in the framework, a spring-pressed rod in said lugs, carrying a knife below and oblique to the axis of the wheel, substantially as described.

6. Beet-harvesting machinery, comprising a ribbed topping-wheel, means for rotating it, a knife carried a predetermined distance below said wheel, and a cleaning-comb fitting said ribbed wheel, substantially as described.

In testimony whereof I have signed my name to this specification in the presence of two subscribing witnesses.

ACHILLE PRUVOT.

Witnesses:
JULES FONTAINE,
HENRI HAINAN.